United States Patent
Kimura

(10) Patent No.: US 12,165,202 B2
(45) Date of Patent: Dec. 10, 2024

(54) TRADING SYSTEM

(71) Applicant: DATACHAIN, INC., Tokyo (JP)

(72) Inventor: Jun Kimura, Tokyo (JP)

(73) Assignee: DATACHAIN, INC., Tokyo (JP)

( * ) Notice: Subject to any disclaimer, the term of this patent is extended or adjusted under 35 U.S.C. 154(b) by 82 days.

(21) Appl. No.: 18/022,412

(22) PCT Filed: Sep. 17, 2021

(86) PCT No.: PCT/JP2021/034365
§ 371 (c)(1),
(2) Date: Feb. 21, 2023

(87) PCT Pub. No.: WO2022/075046
PCT Pub. Date: Apr. 14, 2022

(65) Prior Publication Data
US 2023/0316398 A1 Oct. 5, 2023

(30) Foreign Application Priority Data
Oct. 6, 2020 (JP) .................................. 2020-169096

(51) Int. Cl.
*G06Q 40/04* (2012.01)
*G06Q 20/38* (2012.01)

(52) U.S. Cl.
CPC ........... *G06Q 40/04* (2013.01); *G06Q 20/389* (2013.01)

(58) Field of Classification Search
CPC ...... G06Q 40/04; G06Q 20/389; G06Q 20/06; H04L 2209/56; H04L 9/50
(Continued)

(56) References Cited

U.S. PATENT DOCUMENTS 11,068,470 B2 * 7/2021 Keskar .................. H04L 9/0637
2019/0172026 A1 * 6/2019 Vessenes .............. G06Q 20/065
(Continued)

FOREIGN PATENT DOCUMENTS

CN 112491959 A * 3/2021 ............ G06Q 40/04
JP 2020-057863 A 4/2020
(Continued)

OTHER PUBLICATIONS

Fujimoto et al., "ConnectionChain: Secure Interworking of Blockchains", arXiv: 1911.04708 [cs.CR], <https://doi.org/10.48550/arXiv 1911.04708>, 2019, 4 pages. (Year: 2019).*
(Continued)

*Primary Examiner* — Phuong Thao Cao
(74) *Attorney, Agent, or Firm* — HAUPTMAN HAM, LLP

(57) ABSTRACT

A trading system for atomically executing a smart contract for trading between a first blockchain and a second blockchain includes a coordinator section and a first user section on the first blockchain and a second user section on the second blockchain. The coordinator section sends a first packet created based on a predetermined transaction in which a contract function is specified to the first and second user sections. When the contract function in the first packet received from the coordinator section is successful, the first user section saves a change operation in a state store associated therewith, acquires lock for a change target, and sends a second packet with a status set executable to the coordinator section. When the execution is failed, the first user section discards the change operation in the state store associated therewith and sends a third packet with the status set inexecutable to the coordinator section.

8 Claims, 7 Drawing Sheets

1) Initiate

2) Prepare

3) Confirm

4) Commit

(58) Field of Classification Search
USPC .......................................................... 707/704
See application file for complete search history.

(56) References Cited

U.S. PATENT DOCUMENTS

| | | | | |
|---|---|---|---|---|
| 2019/0303892 | A1* | 10/2019 | Yantis | G06Q 20/3825 |
| 2020/0021602 | A1* | 1/2020 | Irazabal | H04L 9/0637 |
| 2020/0177391 | A1 | 6/2020 | Qiu | |
| 2020/0349561 | A1* | 11/2020 | Kuchkovsky Jimenez | G06F 16/2379 |
| 2021/0233068 | A1 | 7/2021 | Watanabe et al. | |
| 2021/0326869 | A1* | 10/2021 | Fang | G06Q 20/3827 |
| 2022/0094555 | A1* | 3/2022 | Roy | G06Q 20/065 |
| 2022/0156725 | A1* | 5/2022 | Iwama | G06Q 20/3676 |
| 2022/0284011 | A1* | 9/2022 | Qian | G06F 16/2343 |
| 2022/0329411 | A1* | 10/2022 | Kodeswaran | H04L 9/50 |
| 2022/0337436 | A1* | 10/2022 | Beaudet | G06F 9/45558 |
| 2023/0004423 | A1* | 1/2023 | Fatahi | G06Q 20/065 |
| 2023/0222457 | A1* | 7/2023 | Suzuki | G16Y 20/00 705/64 |
| 2024/0029054 | A1* | 1/2024 | Verdian | G06Q 30/0185 |

FOREIGN PATENT DOCUMENTS

| | | | | |
|---|---|---|---|---|
| JP | 2020-071617 | A | 5/2020 | |
| WO | 2019/235198 | A1 | 12/2019 | |
| WO | WO-2021022369 | A1 * | 2/2021 | ......... G06F 16/2365 |
| WO | WO-2021023200 | A1 * | 2/2021 | ......... G06Q 20/401 |
| WO | WO-2021030906 | A1 * | 2/2021 | ......... G06F 9/45558 |

OTHER PUBLICATIONS

Zakhary et al., "Atomic Commitment Across Blockchains", arXiv: 1905.02847v2 [cs. DB], <https://doi.org/10.48550/arXiv.1905.02847 >, Jun. 18, 2019, pp. 1-20. (Year: 2019).*

Robinson et al., "Atomic Crosschain Transactions", arXiv: 2003.00903v2 [cs.CR], <https://doi.org/10.48550/arXiv.2003.00903>, Apr. 2, 2020, pp. 1-10. (Year: 2020).*

Zakhary et al., "Atomic Commitment Across Blockchains", arXiv: 1905.02847v2, Jun. 18, 2019, pp. 1-20, <https://doi.org/10.48550/arXiv.1905.02847>. (Year: 2019).*

Robinson et al., "Atomic Crosschain Transactions", arXiv:2003.00903v2, Apr. 2, 2020, pp. 1-10, <https://doi.org/10.48550/arXiv.2003.00903>. (Year: 2020).*

Tian et al., "Enabling Cross-Chain Transactions: A Decentralized Cryptocurrency Exchange Protocol", IEEE Transactions on Information Forensics and Security, vol. 16, 2021, pp. 3928-3941. (Year: 2021).*

Dauber et al., "2-Phase Commit With a Blockchain Coordinator", 7pages, accessed online at <https://www.scs.stanford.edu/22sp-cs244b/projects/2%20Phase%20Commit%20With%20a%20Blockchain%20Coordinator.pdf> on Sep. 11, 2024. (Year: 2024).*

PCT/IB/373, "International Preliminary Report on Patentability for PCT International Application No. PCT/ JP2021/034365," Apr. 20, 2023.

PCT/ISA/210, "International Search Report for PCT International Application No. PCT/JP2021/034365," Dec. 14, 2021.

Fujimoto, Shingo et al., Proposal of secure cooperation method for blockchain., Proceedings of 2018 Symposium on Cryptography and Information Security (SCIS2018), Jan. 23, 2018.

* cited by examiner

FIG. 1
1) Initiate
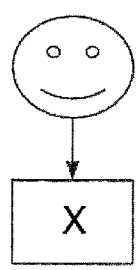
2) Prepare
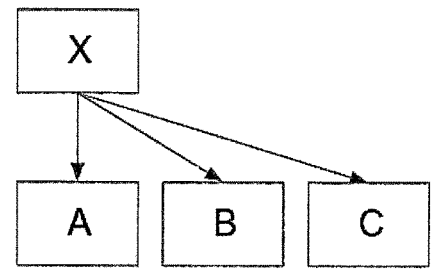
3) Confirm
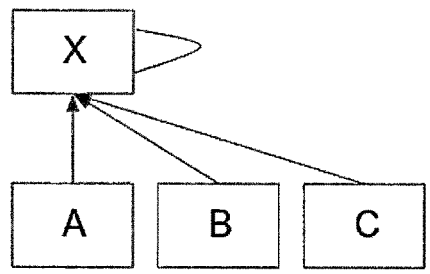
4) Commit
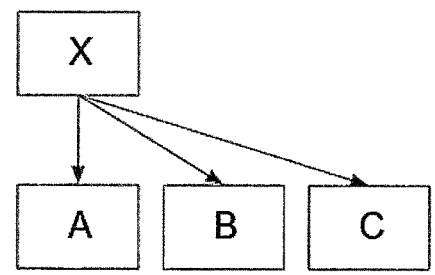

FIG. 2
1) Initiate
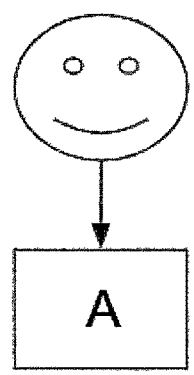
2) Prepare(A)
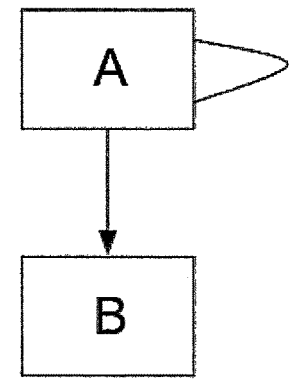
3) Commit(B)
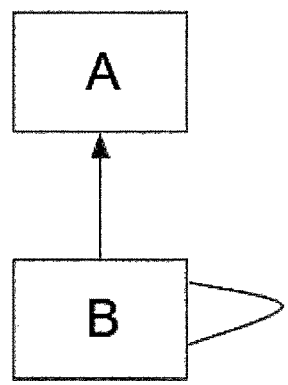
4) Commit(A)
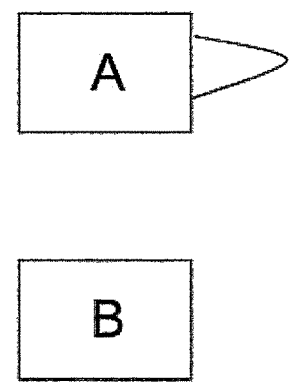

FIG. 4A

```
/* Security */

// Constant value: OWNER_COUNT: KEY OF State store ASSOCIATED WITH
                                NUMBER OF SECURITIES HOLDERS // store: State store // receiver: ID OF ACCOUNT OF ISSUANCE TARGET // amount: AMOUNT OF ISSUANCE function mint(store, receiver, amount) {
    balance := store.Get(receiver)
    store.Set(receiver, balance+amount)
    store.Set(OWNER_COUNT, 1)
}

// store: State store

// sender: ID OF SENDER ACCOUNT

// receiver: ID OF RECEIVER ACCOUNT

// amount: NUMBER OF TRANSFERRED TOKENS function transfer(store, sender, receiver, amount) {
    assert(sender != receiver)

senderBalance := store.Get(sender)
    receiverBalance := store.Get(receiver)

assert(senderBalance >= amount)
```

FIG. 4B

```
if (senderBalance == amount) {
    count := store.Get(OWNER_COUNT)
    store.Set(OWNER_COUNT, count)
} if (receiverBalance == 0) {
    count := store.Get(OWNER_COUNT)
    assert(count < 50)
    store.Set(OWNER_COUNT, count+1)
} store.Set(sender, senderBalance-amount)
store.Set(receiver, receiverBalance+amount)
}
```

FIG. 5

```
/* Coin */

// store: State store
// receiver: ID OF ACCOUNT OF ISSUANCE TARGET
// amount: AMOUNT OF ISSUANCE
function mint(store, receiver, amount) {
    balance := store.Get(receiver)
    store.Set(receiver, balance+amount)
}

// store: State store
// sender: ID OF SENDER ACCOUNT
// receiver: ID OF RECEIVER ACCOUNT
// amount: REMITTANCE
function transfer(store, sender, receiver, amount) {
    assert(sender != receiver)

senderBalance := store.Get(sender)
    receiverBalance := store.Get(receiver)

assert(senderBalance >= amount)

store.Set(sender, senderBalance-amount)
    store.Set(receiver, receiverBalance+amount)
}
```

TRADING SYSTEM

RELATED APPLICATIONS

The present application is National Phase of International Application No. PCT/JP2021/034365 filed Sep. 17, 2021, and claims priority from Japanese Application No. 2020-169096, filed Oct. 6, 2020, the disclosure of which is hereby incorporated by reference herein in its entirety.

TECHNICAL FIELD

The present application relates to a trading system.

BACKGROUND ART

To buy and sell securities by using crypto assets, a license for crypto asset exchange business and a license for financial instrument trading business are required. However, since there are no businesses in Japan who have both of the licenses, securities are currently being bought and sold in legal currency. In other words, securities trading using crypto assets are not conducted in Japan today.

Ethereum, which is widely known as a platform that uses a blockchain to build smart contracts, has adopted standards, such as ERC20 and ERC1400, as the tokens. ERC1400 is a standard for security tokens.

In Japan, there is no service provider that buys and sells securities by using these tokens, so that securities are not bought and sold by using tokens, and tokens are only purchased and verified in legal currency.

Overseas, on the other hand, platforms for buying and selling securities by using these tokens (Polymath, Harbor, Securitize, for example) have been established. Since tokens are generated by smart contracts implemented on the same chain, data on a variety of securities and trading are managed on a single blockchain, issues to be solved include complexity, processing speed, and connectivity with other networks. The smart contract used herein is a mechanism for automatically executing a contract on a blockchain.

CITATION LIST

Patent Literature

Patent Literature 1: Japanese Patent Laid-Open No. 2020-57863

SUMMARY OF INVENTION

Technical Problem

To conduct value trading, the atomicity of the trading needs to be guaranteed. The term "atomicity" in trading means that the trading has either been fully completed or not conducted at all. For example, in a case where it is unclear whether the completion of trading on a blockchain A is always achieved on a blockchain B, on which different value trading is conducted, so that there is a trading problem on the chain B, the trading on the chain A also needs to be aborted.

The aforementioned point will be described in detail with reference to DvP trading of securities. DvP is an abbreviation for Delivery Versus Payment, and DvP trading means that the delivery of securities (Delivery) and cash payment (Payment) are mutually conditioned, so that as long as one of Delivery and Payment is not made, the other will not be made. This is a method/mechanism for avoiding the risk of "delivery or payment failure" in securities settlement, which means that funds (or securities) are delivered, but the securities (or funds) in return are not received from the trading partner (see Bank of Japan website).

In a DvP trading using a blockchain, a blockchain that handles funds and another blockchain that handles securities are provided, and it is unclear whether completion of trading on the blockchain that handles funds also completes the trading on the blockchain that handles securities.

A two-way-peg method and a hashed time-locked contract (HTLC) method have been studied as a method for realizing information-value exchange between different blockchains. The two-way-peg method is a method in which the token receiving chain verifies evidence of a lock or a burn on the token sending chain and then mint the token on the receiving chain, and the method can be carried out in the opposite direction as well. In this method, a security token is generated on the fund-side blockchain, but the fund side cannot check the rules on the securities side (for example, whether the number of transferees has reached the upper limit and whether a user at the transfer destination has already undergone a KYC process). Therefore, when the securities side performs the checking again, the trading may conflict with other trading and results in some cases in trading that cannot be conducted. The HTLC method allows the token receiving user to obtain the token by releasing a pre-image of a hash and further allows the sending user to retrieve the token when the receiving user does not release the pre-image of the hash within the time limit and a timeout occurs. In this method, there is the risk of "delivery or payment failure", in which the payment is completed but the delivery of securities is not completed when the rules on the securities side (for example, the number of transferees has reached the upper limit so that the securities cannot be transferred) prevent the transaction at the timing of the release of the pre-image.

Solution to Problem

Background to Creation of Present Application

It is known that a blockchain alone lacks for interoperability with another blockchain. The relay method is known as a cross-chain method for connecting blockchains to each other. The cross-chain means a crossover from a chain to another chain and vice versa.

ICS (Interchain Standards) has been designed by Cosmos to standardize a protocol stack necessary for the cross-chain. The blockchain technology is currently in its popularization phase, and there are a variety of blockchains, such as the Bitcoin blockchain and the Ethereum blockchain. Under the background described above, ICS has been invented as a project for connecting blockchains to each other to solve the problems of the speed, scalability, and interoperability of blockchains.

As an application protocol using the relay method, protocols for token transfer and exchange using a peg method or an escrow method are being discussed in a variety of communities. In many of these methods, a target token and state can be expressed by a simple state, such as a fungible token (that is, token that can be replaced). Also in Cosmos, a two-way-peg of a fungible token has been proposed in the form of ics-020 as the application protocol.

In view of the circumstances described above, an object of the present application invention is to allow development of a system that can guarantee data integrity in a distributed transaction of a smart contract on a plurality of blockchains.

To achieve the object, the present inventors have developed a framework called Cross Framework and considered that the following elements (1) and (2) are necessary:

(1) Design a distributed consensus protocol for a locking mechanism and commit advisability necessary for a smart contract.

(2) Build a mechanism that allows a developer to transparently satisfy requirements that a contract should meet to enable the distributed consensus protocol.

A transaction that executes such a smart contract corresponds to the cross-chain transaction described above. The cross-chain transaction is synonymous with a distributed transaction conducted between a plurality of different blockchains. It is therefore necessary to guarantee the reliability of transaction processes, such as those defined by ACID properties, in a cross-chain transaction as well as in typical distributed transactions. The ACID properties are the combination of the acronyms of "atomicity", "consistency", "isolation", and "durability". The ACID properties are common technical knowledge and will therefore not be described in detail.

A smart contract is a program executable on blockchains. A smart contract has states and provides functions, and the functions are each released as a function and can be executed in accordance with specified conditions in many cases. A smart contract is executed by a transaction generated by a user and updates the state thereof. In the Cross Framework, a smart contract is provided by implementing a contract handler so that the developer can dynamically call the contract in response to a request. The functions are each defined as a contract function. A cross-chain smart contract refers to a smart contract including calls to the contract functions on the plurality of chains.

The present inventors have then come up with the following Cross Framework that can support the design described above. The Cross Framework is a framework that allows development of a cross-chain smart contract and support for a cross-chain transaction associated with the contract. The framework is formed of a cross module for supporting a cross-chain transaction and a contract module that provides a smart contract. The cross module is a module necessary for realizing a cross-chain transaction and is formed of a cross handler that implements a protocol for atomic commit with another chain via an IBC module and a store that holds the state of the cross handler. The contract module is formed of the contract handler, which provides a smart contract, and a state store that holds the state of the contract handler.

The procedure of the design of the Cross Framework described above will be subsequently described in the following sub-sections: (1) Cross-chain smart contract, (2) Cross-chain transaction, and (3) Atomic commit protocol.

(1) Cross-Chain Smart Contract

The cross-chain smart contract will be described in the form of sub-items (1-1) and (1-2).

(1-1) Contract Handler and State Store

A plurality of contract functions can be implemented in the contract handler. The contract functions are each given a state store for managing the states of the smart contract. The functions each perform a deterministic state transition in accordance with a calling argument and written logic and cause the state to persist in the state store. The state store supports typical key-value storing operations, such as Get (K), Set(K,V), and Delete(K). Get(K) means "return a value corresponding to a key specified by K". Set(K,V) means "set a value specified by V for the key specified by K". Delete (K) means "delete the value corresponding to the key specified by K". When executing the contract functions successively on a single chain, a change made by the transaction may be reflected in the store whenever the contract function execution operation is performed or after the function is executed, but when the contract functions processed by the transaction are distributed across a plurality of chains, all the contract state transitions need to be performed with atomicity. Execution of at least one of the contract functions needs transition to a Prepare state, depending on the atomic commit protocol to be used. That is, since a transaction in such a contract may conflict with other concurrently conducted transactions, the state store needs a mechanism for maintaining the serializability of the transactions. The Cross Framework provides a simple store that acquires locks for the update operations as implementation of a default state store. This store can be configured to acquire the following locks for the update operations.

TABLE 1

| State store operations | locks to be acquired |
| --- | --- |
| Get(K) | None |
| Set(K, V) | Exclusive lock on K |
| Delete(K) | Exclusive lock to K |

(1-2) Cross-Chain Calls

On each chain, the contract functions defined in the contract handler can call the contract functions of another chain, and the calls are defined as cross-chain calls. Therefore, in a cross-chain transaction, not only a plurality of functions can be executed with atomicity, but a smart contract including more complex protocols, such as value transfer between different chains, can be developed.

(2) Cross-Chain Transaction

The cross-chain transaction will be described in the form of sub-items (2-1) to (2-4).

(2-1) A cross-chain transaction is a distributed transaction executable between chains connected to each other via an IBC channel. The Cross Framework provides the state store, which supports a plurality of atomic commit protocols to ensure data integrity in a transaction and implements a lock mechanism to achieve the protocols. The transaction starts when a chain that receives a request from the user verifies the contents of the request and sends a packet containing a contract call request to the specified chain. The chain that receives the user's transaction start request is defined as an initiator chain. Having received the request, the initiator chain executes an atomic commit procedure in accordance with a specified format. For example, when a two phase commit is selected as the atomic commit, the initiator chain plays the role of a coordinator of the two phase commit, calls the contract functions of each chain contained in the user's request, manages the results of the call, and determines whether or not to make the final commit, and each participant chain that receives the decision commits or aborts the transaction.

(2-2) Creation and Verification of Cross-Chain Transaction

To start the cross-chain transaction, the user creates MsgInitiate having the following elements (i) to (iv) and submits the created MsgInitiate to the initiator chain.

(i) Type

Type is the type of each commit procedure. Each commit procedure will be described later in detail.

(ii) Nonce

Nonce is the value of a nonce.

(iii) Timeout

Timeout is the upper limit of a block height or a block time that the transaction can capture.

(iv) Contract Transaction

A contract transaction is contract call information and is an array of structural elements formed of the following (iv-1) to (iv-6):

(iv-1) ChainID

ChainID is an ID indicating a chain that processes the contract transaction.

(iv-2) Signers

Signers is an array of accounts that need to be approved to create the contract transaction.

(iv-3) Call Info

Call Info is call information including a contract identifier, a function name, an argument, and other parameters. The format of Call Info depends on the specifications of the contract handler.

(iv-4) State Constraint

State Constraint means that constraints are placed on the state to which the contract refers and an updated state. State Constraint is, however, optional and can be omitted.

(iv-5) Return Value

Return Value is a value returned from the result of the execution of the contract. Return Value is, however, optional and can be omitted.

(iv-6) Links

During the execution of the contract, Links is the result of the call of another contract referred to. Links is, however, optional and can be omitted.

The accounts are a concept that defines a person who conducts the transaction. Whether the accounts are each appropriate is examined in accordance with the contents of the transaction. Transaction verification logic, account approval, and identifier specifications vary for each blockchain and DLT.

The Cross Framework requires approval of all the accounts specified by Signers ((iv-2) described above) at the start of the transaction. Any logic can be implemented in the method for approving the accounts and the method for examining the accounts, and it is recommended to choose methods suitable for the blockchain and DLT being used. For example, there is an existing implementation using Cosmos-SDK auth/StdTx signature verification.

The initiator chain that receives MsgInitiate needs to check that the cross-chain transaction has been approved by all the accounts that require approval. The verification procedure has several patterns shown below.

Pattern 1: When the accounts each have a key for the initiator chain, MsgInitiate and a signature made by the account are submitted to the initiator chain for verification.

Pattern 2: When the accounts each have no key for the initiator chain, the account asynchronously approves an ID indicating a transaction issued by the submission of MsgInitiate submitted onto the initiator chain.

Pattern 3: When the accounts each have no key for the initiator chain and cannot access the initiator chain, the account approves a chain containing the contract module and examines the result of the approval on the initiator chain via the packet. The procedure described above is suitable for a permissioned chain.

After the verification using any of the methods described above, the initiator chain starts the procedure of making an atomic commit in accordance with Type. The packet containing the transaction of each contract specified in the contract transaction is sent to the contract handler of each chain. The type and details of the commit procedure in the sending operation will be described in the chapter on the atomic commit protocol in (3), which will be described later. Only when the contract functions declared in MsgInitiate are all successfully executed, and there is a constraint on the runtime state, such as State Constraint, irrespective of the type of the commit procedure, all transactions are guaranteed to be committed.

(2-3) State Constraints and Simulation

State constraints are the function of constraining the pre-state and/or post-state when the transaction is conducted. This function is useful when a strict state transition is required when any of the contract functions is executed. When an application requests a transaction in which a contract function is executed, the function can more strictly ensure that the request process is executed only once.

Simulation is a function that allows execution of a contract without generating a transaction. Simulation can be used to generate a constraint to be specified by state constraints. The state of the state store that can be referred to as a constraint is returned by specifying StateConstraintType at the time of Simulate request. The user can specify the state of the state store in StateConstraint of the contract transaction when creating MsgInitiate to place a constraint using the state at the time of Simulation on the transaction.

(2-4) Link and Cross-Chain Calls

To call external contract functions of other contract handlers, such as those introduced in the cross-chain calls described above, the following elements a to c need to be considered.

a. The contract functions of each of the contract handlers are executed concurrently on respective chains in some cases.
b. The external contract functions each need to be executed atomically with the execution of the caller function.
c. The value returned from the execution of any of the external contract functions can be referred to via the caller function.

Out of a to c, a and b are achieved by the atomic commit protocol. Link is the function of satisfying the element c described above.

Link has the following structure:
type Link struct {
SrcIndex uint8
}

SrcIndex specifies the index of the contract transaction indicating the transaction in which the called contract function is executed. Upon receiving MsgInitiate, the initiator chain solves the information on Link in each of the elements of the contract transaction as object ConstantValueObject containing ChainID and Return Value of the called contract function, and the intra-contract-function external call of contract to which Link is referred is replaced with ConstantValueObject.

The following steps 1 to 3 are then carried out:

Step 1: The function that refers to an external contract of the contract handler needs to set ChainID indicating a chain referred to in addition to the call information. The step 1 is implemented, for example, by ChannelID or a domain name in the interchain DNS.

```
type ChainID interface {
Equal(ChainID) bool
}
```
Step 2: The initiator chain solves the information on Link as object ConstantValueObject containing ChainID and Return Value of the called contract function based on the information on Links in each element of the contract transaction.
```
type ConstantValueObject struct {
ChainID
Value [ ]byte
}
```
Step 3: The initiator chain sets the contract transaction as the coordinator, ConstantValueObject from step 2, and the reference destination call information as packet data in accordance with the atomic commit procedure and sends the packet data to the contract handler of each chain.

Step 4: The contract handler in the chain executes the contract function in accordance with the call information in the received packet. When an in-function external contract function is called, the called external contract function is compared with ChainID and call information at the reference destination in the program.

When the result of the comparison is affirmative, the Value of ConstantValueObject is returned. When the result of the comparison is negative, the processes carried out by the function fail.

(3) Atomic Commit Protocol

Atomic commit protocol is a protocol that allows a set of multiple operations to be executable as a single process, and a representative example of the atomic commit protocol is a two phase commit and a three phase commit. In the Cross Framework, two types of protocols, a simple commit protocol and a two-phase commit protocol, can be used. In the simple commit protocol, the number of participants is limited to two. The two-phase commit can support three participants or more.

The two-phase commit protocol and the simple commit protocol will be described in detail in (3-1) and (3-2) below, respectively.

(3-1) Two-Phase Commit Protocol

In the two phase commit (2PC), on the assumption that a chain is the coordinator, and a group of chains that execute other contract functions and made commit are participants, the commit or abort state is reached in the following procedure: When the coordinator requests the participants to prepare for the commit, and all the participants succeed in the preparation, the coordinator issues a commit request to all the participants. If even one person fails to prepare for the commit, the coordinator issues an abort request to all the participants.

The commit procedure will be described with reference to FIG. 1. In FIG. 1, X represents the coordinator, A, B, and C represent the participants, and the arrows indicate the direction of the request in each step of the procedure.

Step 1: Initiate Step

The user submits a transaction start request "MsgInitiate" to the initiator chain. The initiator chain, as the coordinator of the two phase commit, sends "PacketPrepare", which is a packet that requests "Prepare" to the participant chains each containing the functions of the contract specified in "MsgInitiate".

Step 2: Prepare Step

Upon receipt of "PacketPrepare", the participant chains each execute the contract function specified in the contract transaction described above in "(2-2) Creation and verification of cross-chain transaction" (no actual commit is, however, made). When the contract function has been successfully executed, a change operation performed on the state store is saved, and the lock for the change target is acquired. The locking mechanism has been described above in detail in "(1-1) Contract handler and state store" and will therefore not be described again. Finally, "PREPARE_RESULT_OK" indicating the successful execution is set in "Status" of a packet "PacketPrepareAcknowledgement" and returned.

On the other hand, when the execution of the contract function has failed, the change operation is discarded, and "PREPARE_RESULT_FAILED" indicating the failure is set in "Status" of the packet "PacketPrepareAcknowledgement" and returned.

Step 3: Confirm Step

The coordinator chain receives ACK "PacketPrepareAcknowledgement" sent by each of the participant chains in Prepare step (step 2). In each of the ACK processes, the following state transitions 1 to 3 are performed:

1. Wait for next ACK
2. When the "Status" of the received ACK is "PREPARE_RESULT_OK" and there is an unreceived ACK, transition to 1 occurs. Having receives all ACKs, the coordinator chain sets "COMMIT" in "Status" of "PacketCommit", sends "PacketCommit" to issue a commit request to each of the participant chains and proceeds to Commit step in step 4.
3. When the "Status" of any of the received ACKs is "PREPARE_RESULT_FAILED", the coordinator chain sets "ABORT" in "Status" of "PacketCommit", sends "PacketCommit" to issue the abort request to each of the participant chains, and proceeds to Commit step in step Step 4: Commit Step When the commit request has been issued, the participant chains each apply the change operation saved in Prepare step (step 2) to the state store, delete the lock, and send "PacketCommitAcknowledgement", which indicates transaction completion, to the coordinator chain. When the abort request has been issued, the participant chains each delete the change operation and lock saved in Prepare step (step 2) and send "PacketCommitAcknowledgement", which indicates transaction completion, to the coordinator chain.

(3-2) Simple Commit Protocol

The simple commit protocol is an atomic commit protocol with a restraint on the number of participants. Unlike the two phase commit, the number of participants is limited to two in the simple commit protocol, and one of the participants needs to play the role of the coordinator.

The commit procedure will be described with reference to FIG. 2.

Step 1: Initiate

The user submits "MsgInitiate" to the initiator chain to start the cross-chain transaction. In the simple commit protocol procedure, the initiator chain serves both as the coordinator and a participant.

Step 2: Prepare (A)

In A or Prepare, the contract function specified by "MsgInitiate" is executed. When the contract function has been successfully executed, a change operation performed on the state store is saved, and the lock for the change target is acquired. The locking mechanism has been described above in detail in "(1-1) Contract handler and state store" and will therefore not be described again. A packet "PacketDataCall" containing the information on the call for B's contract functions is thereafter created and sent to the channel associated with B. When the execution of the contract function has failed, the transaction process is aborted, and the entire process is terminated.

Step 3: Commit (B)

B receives "PacketDataCall" and executes the specified contract function. When the contract function has been successfully executed, commit is made. "COMMIT_OK" is then set as "Status" in "PacketCallAcknowledgement" and sent to the channel associated with A. When the execution of the contract function has failed, abort is made. "COMMIT_FAILED" is then set as "Status" in "PacketCallAcknowledgement" and sent to the channel associated with A.

Step 4: Commit (A)

A receives "PacketCallAcknowledgement" and checks "Status" thereof. When "Status" is "COMMIT_OK", A applies the change operation saved at the time of Prepare to the state store and deletes the lock. When "Status" is "COMMIT_FAILED", A discards the change operation saved at the time of Prepare and deletes the lock.

Advantageous Effect of Invention

The present application can avoid, for example, a problematic situation in which the fund side cannot check the rules and other pieces of information on the securities side, so that checking made again by the security token side results in unsuccessful trading because of conflicts with other trading as in the two-way-peg method.

BRIEF DESCRIPTION OF DRAWINGS

FIG. 1 shows a commitment procedure.

FIG. 2 shows another commitment procedure.

FIG. 4A is a diagrammatic view of simulation codes (first half).

FIG. 4B is a diagrammatic view of the simulation codes (second half).

FIG. 5 is a diagrammatic view of the simulation codes.

DESCRIPTION OF EMBODIMENT

First Embodiment

Figure 3:
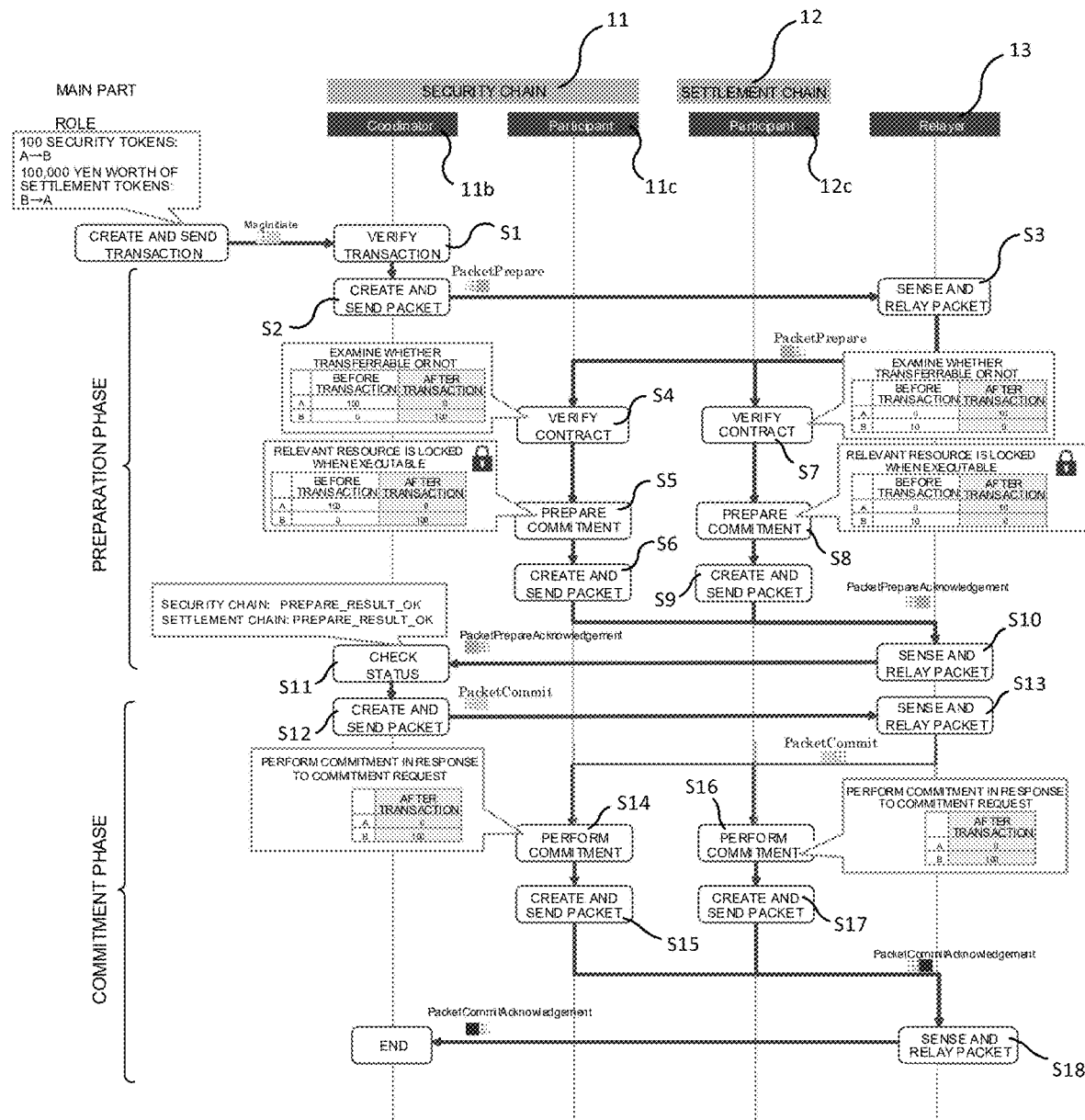
FIG. 3 shows the procedure of execution of a smart contract (first embodiment).

An embodiment of a trading system according to the present application based on the design concept described in the aforementioned chapter Solution to Problem will be described with reference to FIG. 3. FIG. 3 is a sequence procedure of securities trading (in other words, procedure of execution of smart contract).

The trading system according to the present embodiment includes a security chain 11 as a blockchain (corresponding to first blockchain) and a settlement chain 12 as a blockchain (corresponding to second blockchain). A coordinator 11*b* (corresponding to coordinator section) and a participant 11*c* (corresponding to first user section) are disposed on the security chain 11, and participant 12*c* (corresponding to second user section) is disposed on the settlement chain 12. In the present embodiment, it's a form of security trading instruction that 100 security tokens are transferred between two users (hereinafter referred to as users A and B), from the user A to the user B, on the security chain, and that 100,000 yen worth of settlement tokens are transferred from the user B to the user A on the settlement chain. At this point, it can provide a framework that can call secure smart contracts with atomicity between the security chain 11 and the settlement chain 12.

The coordinator 11*b*, the participant 11*c*, the participant 12*c*, and a relayer 13 are each realized by a computer, and the coordinator 11*b*, the participant 11*c*, and the participant 12*c* form a distributed network. The coordinator 11*b* and the participants 11*c*, 12*c* communicate with each other via the relayer 13. The users A and B correspond to the participants 11*c* and 12*c*, respectively.

The coordinator 11*b* includes an IBC module and a cross module as a layer structure.

The participant 11*c* includes an IBC module, a cross module, and a contract module as a layer structure. A security token issuance contract and a transfer contract are defined in the contract handler that forms the contract module on the security chain 11. FIGS. 4A and 4B show simulation codes divided into a first half and a second half, respectively. The participant 12*c* includes an IBC module, a cross module, and a contract module as a layer structure, as the participant 11*c*. A settlement token issuance contract and a transfer contract are defined in the contract handler that forms the contract module on the settlement chain 12. FIG. 5 shows the simulation codes.

The following processes have been assumed to be carried out as a precondition for the smart contract.

A transaction (MsgInitiate) is created so as to have as arguments a contract function (transfer in FIG. 4A) called to transfer the security tokens from the user A to the user B on the security chain 11 and a contract function (transfer in FIG. 5) called to transfer the settlement tokens from the user B to the user A on the settlement chain 12. The created transaction is sent to the coordinator 11*b*. The following sequence procedure is executed on the assumption that the processes described above have been carried out. The present sequence procedure can be divided into two phases primarily formed of a "preparation phase" and a "commitment phase".

The coordinator lib checks the received transaction (MsgInitiate) and examines whether there is no problem with the transaction format (step S1). When there is even one problem, the transaction is immediately discarded and the entire process is terminated. When there is no problem, the procedure proceeds to the process in step S2.

The coordinator lib creates a packet (PacketPrepare) based on the verified transaction (MsgInitiate) and sends the created packet to the participant 11*c* on the security chain 11 and the participant 12*c* on the settlement chain 12 via the relayer 13 (steps S2 and S3). The packet (PacketPrepare) corresponds to the "first packet" described in claim 1.

The participant 11*c* on the security chain 11 checks the packet (PacketPrepare) received via the relayer 13 and examines whether or not the 100 security tokens are transferrable from the user A to the user B (step S4). The participant 11*c* specifically executes the contract function specified in the received packet (PacketPrepare) (note that no commitment is actually made at this point).

When the execution of the contract function has failed, the change operation is discarded, and "PREPARE_RESULT_FAILED" is set in "Status" of the packet (PacketPrepareAcknowledgement) (in other words, "Status" is set to be inexecutable) and sent to the coordinator 11*b* on the security chain 11 via the relayer 13 (steps S6 and S10). The packet to be sent at this point (PacketPrepareAcknowledgement) corresponds to the "third packet" described in claim 1. When the contract function has been successfully executed, the change operation is saved in the state store associated therewith, and the lock for the change target is acquired (step S5). After successful acquisition of the lock, "PREPARE_RESULT_OK" is set in "Status" of the packet (PacketPrepareAcknowledgement) (in other words, "Status" is set to be executable) and sent to the coordinator 11$b$ on the security chain 11 via the relayer 13 (steps S6 and S10). The packet to be sent at this point (PacketPrepareAcknowledgement) corresponds to the "second packet" described in claim 1.

The participant 12$c$ on the settlement chain 12 checks the packet (PacketPrepare) received via the relayer 13 and examines whether 100,000 yen worth of settlement tokens are transferrable from the user B to the user A in return for the security tokens (step S7). The participant 12$c$ specifically executes the contract function specified in the received packet (PacketPrepare) (note that no commitment is actually made at this point).

When the execution of the contract function has failed, the change operation is discarded, and "PREPARE_RESULT_FAILED" is set in "Status" of the packet (PacketPrepareAcknowledgement) (in other words, "Status" is set to be inexecutable) and sent to the coordinator 11$b$ on the security chain 11 via the relayer 13 (steps S9 and S10). The packet to be sent at this point (PacketPrepareAcknowledgement) corresponds to the "fifth packet" described in claim 1. When the contract function has been successfully executed, the change operation is saved in the state store associated therewith, and the lock for the change target is acquired (step S8). After successful acquisition of the lock, "PREPARE_RESULT_OK" is set in "Status" of the packet (PacketPrepareAcknowledgement) (in other words, "Status" is set to be executable) and sent to the coordinator 11$b$ on the security chain 11 via the relayer 13 (steps S9 and S10). The packet to be sent at this point (PacketPrepareAcknowledgement) corresponds to the "fourth packet" described in claim 1.

After the processes described above are carried out, the coordinator 11$b$ receives the packet (PacketPrepareAcknowledgement) from each of the participants (participants 11$c$ and 12$c$ in present embodiment).

The coordinator 11$b$ checks the received packet (PacketPrepareAcknowledgement) (step S11) and carries out the following processes in accordance with the "Status". That is, when even one packet having "Status=PREPARE_RESULT_FAILED" is received, the procedure proceeds to step S12 to issue the abort request. When the packet having "Status=PREPARE_RESULT_OK" is received from all the participants (participants 11$c$ and 12$c$ in present embodiment), the procedure proceeds to step S12 to issue the commitment request.

The commitment phase starts at step S12. To issue the abort request in step S12, a packet (PacketCommit) is created, "Status" is set to be "ABORT", and the packet is multicast via the relayer 13 to all the participants (participants 11$c$ and 12$c$ in present embodiment) (steps S13, S14, and S16). The packet for issuing the abort request (PacketCommit) corresponds to the "seventh packet" described in claim 1. To issue the commitment request in step S12, a packet (PacketCommit) is created, "Status" is set to be "COMMIT", and the packet is multicast via the relayer 13 to all the participants (participants 11$c$ and 12$c$ in present embodiment) (steps S13, S14, and S16). The packet for issuing the commit request (PacketCommit) corresponds to the "sixth packet" described in claim 1.

In step S14, when the Status of the received packet (PacketCommit) is "COMMIT", the participant 11$c$ applies the change operation saved in the preparation phase to the state store, deletes the lock, and sends a packet (PacketCommitAcknowledgement), which indicates transaction completion, to the coordinator 11$b$ (steps S15 and S18).

The packet (PacketCommitAcknowledgement) to be sent at the time of commitment corresponds to the "eighth packet" described in claim 1.

On the other hand, when the "Status" of the received packet is "ABORT", the change operation saved in the preparation phase and the lock are deleted, and the packet (PacketCommitAcknowledgement), which indicates transaction completion, is sent to the coordinator 11$b$ (steps S15 and S18). The packet (PacketCommitAcknowledgement) to be sent at the time of abort corresponds to the "ninth packet" described in claim 1.

The processes carried out in steps S16 and S17 are the same as the processes carried out in steps S14 and S15, respectively, and will not be described in detail.

As described above, according to the present embodiment, the participant 11$c$ on the security chain 11 and the participant 12$c$ on the settlement chain 12 are each interrogated about the achievability of the transaction, and the result of the call of the contract functions in a plurality of chains is committed only when the achievability is confirmed by both the participants. The present application avoid, for example, a problematic situation in which the fund side cannot check the rules and other pieces of information on the securities side (for example, whether the number of transferees has reached the upper limit and whether the user at the transfer destination has already undergone a KYC process), so that checking made again by the security chain side results in unsuccessful trading because of conflicts with other trading as in the two-way-peg method.

Second Embodiment

The processes described in the aforementioned first embodiment can also be used for other trading (testamentary trust, for example) that require the atomicity of the trading. In this case, the first embodiment can be applied to testamentary trust trading by using the security chain 11 as an inheritance chain (corresponding to first blockchain) and the settlement chain 12 as an asset chain (second blockchain).

An ancestor presents a will or assets to a trust company, and the will or the assets are registered as a smart contract on the inheritance chain. In the past, when the ancestor dies, an heir contacts the trust company, and the trust company needs to inquire an asset management company about the assets to see if the will can be executed.

In the present embodiment, in which the atomicity is guaranteed when the asset chain is interrogated about whether the assets is transferable based on the will registered on the inheritance chain, heritage division conditions do not apply, and there is no need to check if the will is overthrown and the heritage cannot be divided, unlike in the case where the two-way-peg method is used. Furthermore, the trust company can check the results of both the execution of the contents of the will and the execution of the asset division.

Third Embodiment

Figure 6:
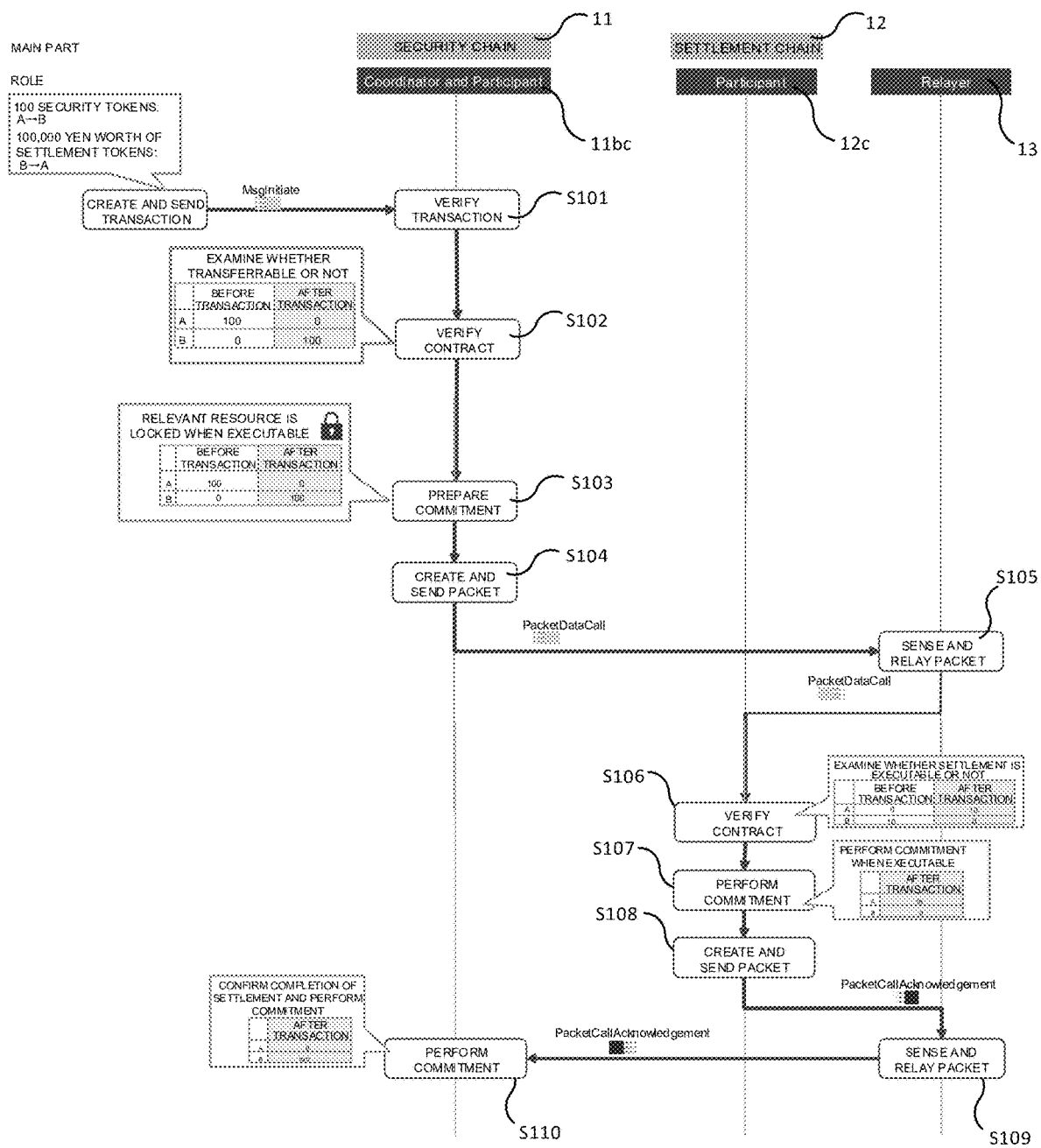
FIG. 6 shows the procedure of execution of a smart contract (third embodiment).

A third embodiment of the present application will be described with reference to the flowchart of FIG. 6. The present embodiment differs from the first embodiment in that the processes carried out by the coordinator 11$b$ and the participant 11$c$ are carried out by a dual-role section 11$bc$. As a result, one of the participants can skip the preparation of commit. Processes in the present embodiment will be described in a securities trading scenario by way of example, as in the first embodiment. It is, however, noted that the processes described in the present embodiment can also be used for other trading (testamentary trust, for example) that require the atomicity of the trading. This point has been described in detail in the second embodiment and will therefore not be described. The trading system according to the present embodiment is designed based on a commitment scheme (simple commitment protocol) that allows omission of the commitment preparation performed by one of the participants. This commitment scheme differs from the two phase commitment in the first embodiment in that the number of participants is limited to two. Furthermore, one of the participants plays the role of the coordinator.

The dual-role section 11bc is realized by a computer. The dual-role section 11bc and the participant 12c form a distributed network. The dual-role section 11bc and the participant 12c communicate with each other via the relayer 13.

The processes performed before step S101 are the same as those in the first embodiment and will therefore not be repeatedly described. In step S101, the dual-role section 11bc checks the received transaction (MsgInitiate) to examine whether there is no problem with the transaction format. When there is even one problem, the transaction is immediately discarded and the entire process is terminated.

In the present embodiment, the dual-role section 11bc, which serves as both the coordinator and a participant, examines as the participant whether the 100 security tokens are transferable from the user A to the user B at this timing (step S102).

The dual-role section 11bc specifically executes the contract function specified in the received transaction (MsgInitiate) (note that no commitment is actually made at this point). When the execution of the contract function has failed, the transaction process is aborted, and the entire process is terminated.

When the contract function has been successfully executed, the dual-role section 11bc saves the change operation in the state store as a participant associated therewith and acquires the lock for the change target (step S103). After the lock can be acquired, a packet (PacketDataCall) containing information on the call of the contract function on the settlement chain (in present embodiment, contract function called to transfer 100,000 yen worth of settlement tokens from user B to user A on settlement chain) is created and sent to the participant 12C (steps S104 and S105). The packet described above corresponds to the "first packet" described in claim 5.

In step S106, the participant 12c receives the packet (PacketDataCall) and executes the specified contract function. When the contract function has been successfully executed, commitment is made (step S107). "COMMIT_OK" is then set in "Status" in the packet "PacketCallAcknowledgement" and sent to the dual-role section 11bc (steps S108 and S109). The packet (PacketCallAcknowledgement) to be sent to the dual-role section 11bc at the time of the commitment corresponds to the "second packet" described in claim 5. When the execution of the contract function has failed, the contract function is aborted. "COMMIT_FAILED" is then set in "Status" in the packet "PacketCallAcknowledgement" and sent to the dual-role section 11bc (steps S108 and S109). The packet (PacketCallAcknowledgement) to be sent to the dual-role section 11bc at the time of the abort corresponds to the "third packet" described in claim 5.

The dual-role section 11bc checks the packet (PacketCallAcknowledgement) received from the participant 12c as a process carried out by a participant and makes commitment when "Status" is COMMIT_OK (applies saved change operation to state store and delete lock). When "Status" is COMMIT_FAILED, the dual-role section 11bc makes abort (deletes saved change operation and lock).

As described above, according to the present embodiment, the atomicity of trading is guaranteed on the security chain 11 and the settlement chain 12. The present application can therefore avoid, for example, a problematic situation in which the fund side cannot check the rules (limited to private placement, for example) and other pieces of information on the securities side, so that checking made again by the security token side results in unsuccessful trading because of conflicts with other trading as in the two-way-peg method.

Variations of Third Embodiment

In the present embodiment, the participant on the security chain 11 plays the role of the coordinator, and the participant 12c on the settlement chain 12 may instead play the role as the coordinator. When the present embodiment is applied to a testamentary trust use case, the dual-role section 11bc can be implemented in the inheritance chain, and the participant 12c can be implemented in the asset chain. Still instead, the participant 12c may be implemented in the inheritance chain, and the dual-role section 11bc may be implemented in the asset chain.

REFERENCE SIGNS LIST

11 Security chain, Inheritance chain
11b Coordinator
11c, 12c Participant
12 Settlement chain, Asset chain
13 Relayer

The invention claimed is:

1. A trading system for atomically executing a smart contract related to trading between a first blockchain and a second blockchain, the system comprising:
   a coordinator section realized by a first computer and a first user section, realized by a second computer, on the first blockchain; and
   a second user section, realized by a third computer, on the second blockchain,
   wherein the coordinator section realized by the first computer, the first user section realized by the second computer, and the second user section realized by the third computer form a distributed network for executing a smart contract related to trading between the first blockchain and the second blockchain;
   wherein the coordinator section realized by the first computer sends a first packet created based on a predetermined transaction in which a contract function of the smart contract is specified to the first user section and the second user section,
   when the contract function in the first packet received from the coordinator section realized by the first computer has been successfully executed, the first user section realized by the second computer saves a change operation performed on a state store associated therewith, acquires a lock for a change target, and sends a second packet with a status set executable to the coordinator section realized by the first computer, whereas when the execution has failed, the first user section realized by the second computer discards the change operation performed on the state store associated therewith and sends a third packet with the status set inexecutable to the coordinator section realized by the first computer, when the contract function in the first packet received from the coordinator section realized by the first computer has been successfully executed, the second user section realized by the third computer saves a change operation performed on a state store associated therewith, acquires a lock for a change target, and sends a fourth packet with a status set executable to the coordinator section realized by the first computer, whereas when the execution has failed, the second user section realized by the third computer discards the change operation performed on the state store associated therewith and sends a fifth packet with the status set inexecutable to the coordinator section realized by the first computer, the coordinator section realized by the first computer sends a sixth packet to the first user section realized by the second computer and the second user section realized by the third computer to issue a commit request, upon receipt of the third packet from the first user section realized by the second computer and/or the fifth packet from the second user section realized by the third computer, the coordinator section realized by the first computer sends a seventh packet to the first user section realized by the second computer and the second user section realized by the third computer to issue an abort request, and upon receipt of the sixth packet from the coordinator section, the first user section realized by the second computer and the second user section realized by the third computer apply the change operation saved in advance to the state store, delete the lock, and send an eighth packet to the coordinator section realized by the first computer, whereas upon receipt of the seventh packet from the coordinator section realized by the first computer, the first user section realized by the second computer and the second user section realized by the third computer delete the change operation saved in advance and the lock, and send a ninth packet to the coordinator section realized by the first computer.

2. The trading system according to claim 1, further comprising a relayer realized by a fourth computer that relays communication in the distributed network between the coordinator section realized by the first computer, the first user section realized by the second computer, and the second user section realized by the third computer.

3. The trading system according to claim 1, wherein the first blockchain is a security chain, and the second blockchain is a settlement chain.

4. The trading system according to claim 1, wherein the first blockchain is an inheritance chain, and the second blockchain is an asset chain.

5. A trading system for atomically executing a smart contract related to trading between a first blockchain and a second blockchain, the system comprising:

a dual-role section that serves as both a coordinator section and a first user section realized by a first computer, the dual-role section provided on the first blockchain; and a second user section, realized by a second computer, on the second blockchain, wherein the coordinator section and the first user section realized by the first computer, and the second user section realized by the second computer form a distributed network for executing a smart contract related to trading between the first blockchain and the second blockchain, upon receipt of a predetermined transaction, in which a contract function of the smart contract is specified, the dual-role section executes the contract function, when the contract function is successfully executed, the dual-role section stores a change operation performed on a state store associated therewith as the first user section realized by the first computer, acquires a lock for a change target, and sends a first packet to the second user section realized by the second computer, whereas when the contract function is not successfully executed, the dual-role section realized by the first computer terminates processing of the predetermined transaction, the second user section realized by the second computer executes the contract function based on the first packet received from the dual-role section realized by the first computer, makes commit when the contract function has been successfully executed and sends a second packet with the status set executable to the dual-role section realized by the first computer, whereas the second user section realized by the second computer sends a third packet with the status set inexecutable to the dual-role section realized by the first computer to issue an abort request when the execution failed, and upon receipt of the second packet from the second user section realized by the second computer, the dual-role section realized by the first computer applies the change operation stored in advance as the first user section realized by the first computer to the state store and deletes the lock, whereas upon receipt of the third packet from the second user section realized by the second computer, the dual-role section realized by the first computer discards the change operation saved in advance and deletes the lock as the first user section realized by the first computer.

6. The trading system according to claim 5, further comprising a relayer realized by a third computer that relays communication in the distributed network between the dual-role section realized by the first computer and the second user section realized by the second computer.

7. The trading system according to claim 5, wherein the first blockchain is one of a security chain and a settlement chain, and the second blockchain is another of the chains.

8. The trading system according to claim 5, wherein the first blockchain is one of an inheritance chain and an asset chain, and the second blockchain is another of the chains.

* * * * *